July 22, 1958     A. HOVEY ET AL     2,843,888
ARCH BEAD
Filed June 11, 1953

INVENTORS
ALVA HOVEY
RALPH V. HOVEY
BY
John W. Michael
ATTORNEY

United States Patent Office 2,843,888
Patented July 22, 1958

2,843,888
ARCH BEAD

Alva Hovey, Antigo, Wis., and Ralph V. Hovey, Bessemer, Mich.

Application June 11, 1953, Serial No. 360,932

1 Claim. (Cl. 20—74)

This invention relates to arch beads used in building construction on corners, arches, etc. The present bead is particularly adapted for use in conjunction with dry wall construction where a small bead is desired to minimize the amount of material to be "feathered" over the dry wall adjacent the corner.

An object of this invention is to provide an arch bead which is easily formed to the desired shape, reduces the installation labor, provides generous bonding area, and provides a strong bead which is smaller than beads now available.

Dry wall construction has, of late, been vastly improved, particularly in the direction of obtaining a neat plaster-like finish in which joints are concealed and corners are finished with an arch bead. After the bead has been nailed in place special material is "feathered" onto the dry wall to blend the surface into the top of the bead. The smaller this bead can be made the better the job will look since less material is required, resulting in better blending into the dry wall surface. The arch beads available commercially are designed principally for conventional plaster construction and require a great amount of work to form them satisfactorily for dry wall techniques. Even when handled in a most workmanlike manner the bead obtained is too high for a first class finish. The present arch bead, however, can be formed in but a small fraction of the time required to form prior beads and results in a much smaller bead which lends to an excellent finish.

The prior arch beads require considerable time to form to a curve while our new bead can be formed to a curve merely by rolling a roller over the bead while the bead is held against the curve it is to fit. After the arch bead has been formed to the desired curve a simple cutting operation completes the preparation of the bead for nailing in place. While the forming of this bead is far faster and simpler as compared to prior arch beads the greatest advantage lies in the end result which provides a small bead ideally suited to dry wall construction techniques.

Other objects and advantages will be pointed out in, or be apparent from, the specification and claim, as will obvious modifications of the single embodiment shown in the drawings, in which:

Figure 1:
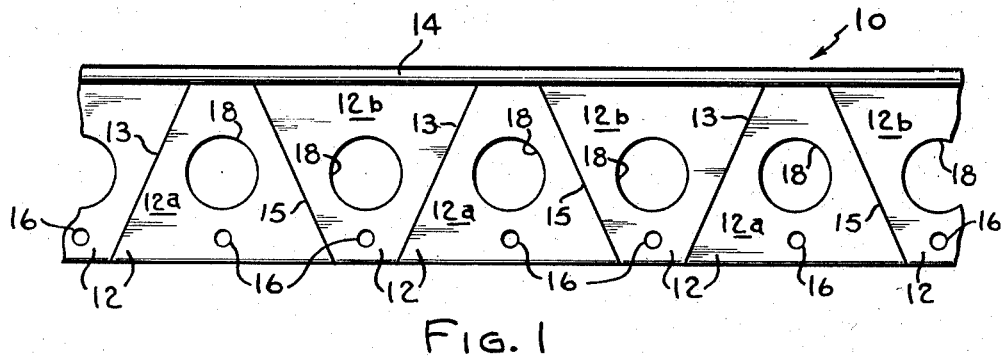
Fig. 1 is an elevation of our arch bead.
Figure 3:
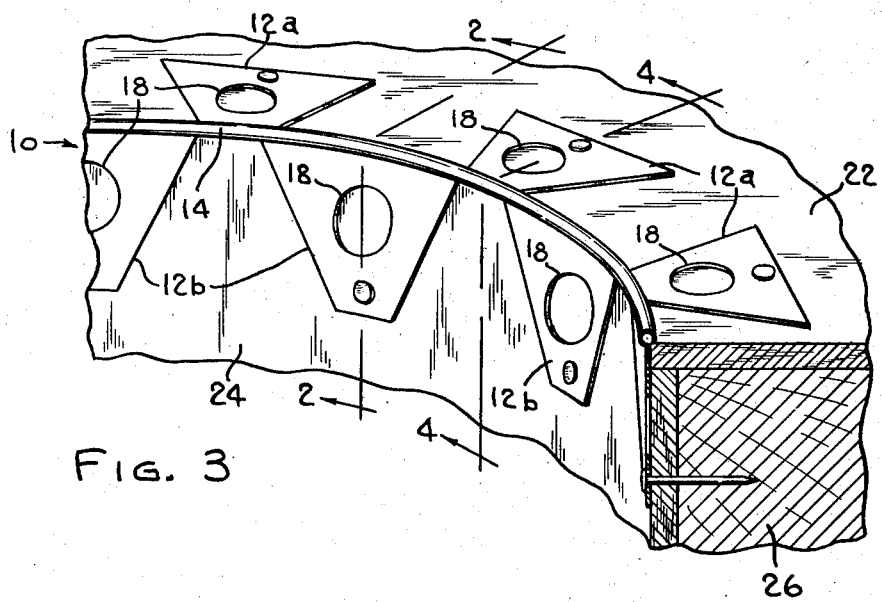
Fig. 3 is a fragmentary perspective view of the arch bead nailed in place.

Considering the drawings in detail, the thin, metal arch bead 10 has a flat portion 12 with a rolled bead 14 along one edge thereof. The flat portion 12 is provided with nail holes 16 and large holes 18 which serve no purpose other than reducing the area of the strip 12 to afford more area for the plaster-like material to bond to the dry wall sheet material. It is to be noted that the bead 14 is partly open, that is, the free edge 20 of the bead does not touch the rest of the bead or the strip 12 but is spaced therefrom. This construction is preferred since it facilitates forming the bead to an arch (curve) and provides a better fit to the corner as will be pointed out more fully hereinafter.

When manufacturing the arch bead the strip 12 may be cut along lines 13, 15 to form alternate tabs 12a and 12b which converge and diverge, respectively towards the bead. The strip may be left uncut, if desired, to allow the cutting to be done on the job which has some advantages which will be pointed out hereinafter. If the strip is left uncut, the cutting lines could be indicated on the strip to guide the artisan on the job.

Figure 2:
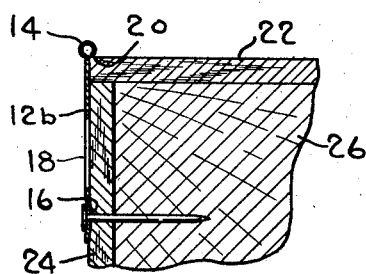
Fig. 2 is a section of the bead as it would appear in the forming operation or as a section of Fig. 3 on line 2—2 would appear.
Figure 4:
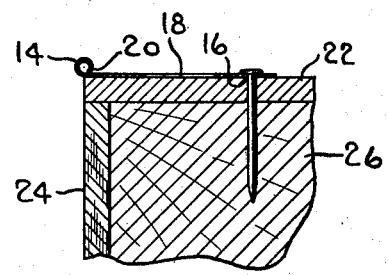
Fig. 4 is a section of Fig. 3 taken on line 4—4.

In use the arch bead is first laid up to the work with the open edge of the bead next to the dry wall material. This position would be comparable to that illustrated in Fig. 2 where the open edge 20 of bead 14 rests on top of the dry wall sheet 22 forming the wall while the strip 12 lies against sheet 24 forming the inside of the arch. It will be appreciated that sheets 22, 24 are nailed to wood form 26 in accordance with the usual practice. When one end of the arch bead 10 has been placed as described and as shown in Fig. 2 a small roller about the width of the arch bead may be rolled over the arch bead to form it to the curve of the arch (the arch serves as a mandrel). This operation is extremely fast. The forming can be done by hand if desired but is not as fast or as convenient. It will be realized that no forming is required where the arch bead is used on an ordinary outside corner.

After the arch bead has been formed to the arch the strip 12 is cut with tin shears. When using the pre-cut form or after cutting the strip in the uncut form the tabs 12a converging towards the bead 14 are bent by hand about 90° to pass under the open part of the bead. Tabs 12a lie against wall sheet 22 while the diverging tabs 12b lie against the inside sheet 24. When in place the arch bead is nailed through the nail holes 16.

The open bead is of advantage in the forming of the arch bead to the curve and in bending tabs 12a. The open bead deforms slightly during the forming process rather than resisting the curvature as would be the case with a closed bead. When bending the tabs 12a the narrow portion of the tab passes under the bead readily without distorting the curve previously imparted to the bead 14. The placement of the open edge of the bead on the outside of the curve facilitates the distortion of the bead during the forming of the arch bead and also obtains a sealing fit on wall sheet 22 as may be seen in Fig. 2. While we have referred to distortion of the bead it should be realized that the bead retains excellent strength which, coupled with the seating fit on sheet 22, resists blows on the corner as well as or better than prior arch beads.

When using this arch bead on a straight run (an outside corner) no forming is necessary and if using the uncut bead only a few tabs 12a need be cut to obtain satisfactory results and in this sense the uncut form is advantageous. However, the best job will be obtained if all tabs are employed and in such cases the pre-cut bead is desirable.

The present arch bead can be manufactured at low cost since the bead can be rolled and the holes may be easily stamped in the flat strip 12. Cuts 13, 15 may be stamped simultaneously with the holes when manufacturing the pre-cut arch bead. The arch beads can be packed and shipped with little waste space. The weight of the present arch bead per foot is but a fraction of prior art beads. Thin steel serves quite satisfactorily and other metals can no doubt be used. The great advantage in the present arch beads, however, lies in superior results and faster and easier handling. While an open bead has been shown and described it should be noted that a closed bead could be used if desired.

Although but one embodiment of the present invention has been illustrated and described, it will be apparent to those skilled in the art that various changes and modifications may be made therein without departing from the spirit of the invention or from the scope of the appended claim.

We claim:

An arch bead comprising an elongated flat strip having a partly open bead along one of its longitudinal edges and having a plurality of cuts in the strip extending from the bead through the opposed longitudinal edge of the strip and defining a plurality of flat tabs, said cuts being oppositely inclined with respect to the bead so the bases of alternate tabs are substantially different in length along the bead.

References Cited in the file of this patent

UNITED STATES PATENTS

| | | |
|---|---|---|
| 830,792 | Kuhne | Sept. 11, 1906 |
| 1,015,381 | Doner | Jan. 23, 1912 |
| 1,147,090 | Higgins | July 20, 1915 |
| 1,379,862 | Goldsmith | May 31, 1921 |
| 2,274,662 | Briggs et al. | Mar. 3, 1942 |